(12) United States Patent
Watanabe et al.

(10) Patent No.: US 8,842,799 B2
(45) Date of Patent: Sep. 23, 2014

(54) JET PUMP AND METHOD FOR RESTRAINING VIBRATION OF THE SAME

(75) Inventors: Masanobu Watanabe, Yokohama (JP);
Kunihiko Kinugasa, Yokohama (JP);
Tsuyoshi Hagiwara, Kawasaki (JP);
Masahiko Warashina, Chigasaki (JP);
Jun Suzuki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 449 days.

(21) Appl. No.: 13/258,983

(22) PCT Filed: Apr. 2, 2010

(86) PCT No.: PCT/JP2010/056082
§ 371 (c)(1),
(2), (4) Date: Sep. 22, 2011

(87) PCT Pub. No.: WO2010/114124
PCT Pub. Date: Oct. 7, 2010

(65) Prior Publication Data
US 2012/0027158 A1 Feb. 2, 2012

(30) Foreign Application Priority Data
Apr. 3, 2009 (JP) ................................. 2009-090815

(51) Int. Cl.
*G21C 15/25* (2006.01)
*F04F 5/44* (2006.01)
*F04F 5/46* (2006.01)
*F04F 5/54* (2006.01)
*F04F 5/10* (2006.01)
*G21C 15/00* (2006.01)

(52) U.S. Cl.
CPC ................ *G21C 15/25* (2013.01); *F04F 5/463* (2013.01); *F04F 5/54* (2013.01); *F04F 5/10* (2013.01); *Y02E 30/40* (2013.01)
USPC ........... 376/372; 417/312; 376/260; 376/347; 376/361; 376/366; 376/370; 376/402; 376/407; 277/345; 277/358; 277/377; 277/379

(58) Field of Classification Search
USPC ......... 376/347, 361, 366, 370, 372, 354, 359, 376/360, 402, 407, 260; 417/65, 151, 321, 417/360, 312; 277/345, 358, 377, 379
See application file for complete search history.

(56) References Cited

U.S. PATENT DOCUMENTS 3,378,456 A * 4/1968 Roberts .......................... 376/407
3,389,055 A * 6/1968 Hughes ......................... 376/407
(Continued)

FOREIGN PATENT DOCUMENTS

| JP | 56-132500 A | 10/1981 |
|----|-------------|---------|
| JP | 58 15798 | 1/1983 |
| JP | 2003 90894 | 3/2003 |
| JP | 2008-170367 A | 7/2008 |
| WO | 2009 035098 | 3/2009 |

OTHER PUBLICATIONS

International Preliminary Report on Patentability and Written Opinion issued Nov. 15, 2011 in patent application No. PCT/JP2010/056082 filed Apr. 2, 2010.

(Continued)

*Primary Examiner* — Bernarr Gregory
(74) *Attorney, Agent, or Firm* — Oblon, Spivak, McClelland, Maier & Neustadt, L.L.P.

(57) ABSTRACT

A jet pump which can restrain self-excited vibration in a connection portion between an inlet mixer pipe and a diffuser pipe without inhibiting a structural deformation due to thermal expansion and the like includes a slip joint structure connecting the inlet mixer pipe and the diffuser pipe to each other by inserting the inlet mixer pipe into an upper end opening of the diffuser pipe with a clearance left therebetween; and a self vibration damping structure configured such that when the clearance defined by an outer pipe wall of the inlet mixer pipe and an inner pipe wall of the diffuser pipe is widening or narrowing due to vibration of the inlet mixer pipe or the diffuser pipe, a flow path resistance inside a clearance flow path for pumped coolant water defined by the clearance is not smaller than a fluid inertia force all over the clearance flow path.

16 Claims, 17 Drawing Sheets

(56) References Cited

U.S. PATENT DOCUMENTS

| | | | |
|---|---|---|---|
| 4,285,770 A * | 8/1981 | Chi et al. | 376/407 |
| 6,394,765 B1 * | 5/2002 | Erbes et al. | 417/360 |
| 6,438,192 B1 * | 8/2002 | Erbes et al. | 376/372 |
| 6,450,774 B1 * | 9/2002 | Erbes et al. | 417/151 |
| 6,587,535 B1 * | 7/2003 | Erbes et al. | 376/260 |
| 8,023,609 B2 * | 9/2011 | Dulka et al. | 376/372 |
| 2003/0118144 A1 | 6/2003 | Erbes et al. | |

OTHER PUBLICATIONS

Extended Search Report issued Jun. 11, 2013 in European Patent Application No. 10758891.5.

International Search Report issued Jul. 6, 2010 in PCT/JP10/056082 filed Apr. 2, 2010.

* cited by examiner

US 8,842,799 B2

JET PUMP AND METHOD FOR RESTRAINING VIBRATION OF THE SAME

FIELD

The present invention relates to a jet pump disposed in a reactor pressure vessel of a boiling water reactor to cause a forced circulation of coolant water in the reactor pressure vessel, and in particular to a technique for restraining vibration of the jet pump.

BACKGROUND

Conventionally, an inlet mixer pipe and a diffuser pipe for jet pumps used in boiling water reactors are connected to each other by inserting the inlet mixer pipe into an upper end opening of the diffuser pipe with a clearance left therebetween. This is known as a slip joint structure. The slip joint structure has a clearance which accommodates a structural deformation due to thermal expansion, and acts as an adjusting allowance in connection of members.

The clearance provided in the slip joint structure forms a clearance flow path for coolant through which pumped coolant transferred from the inlet mixer pipe to the diffuser pipe is trying to overflow from the clearance. It is known that when a clearance flow flowing through the clearance flow path reaches a certain flow rate, a vibration having a large amplitude, referred to as self-excited vibration, occurs which may lead to a damage to the jet pump. Note that even in the case of a minute vibration which does not lead to the self-excited vibration, when the minute vibration continues for a long time, e.g., sliding wear of an interconnection portion between a wedge and a riser bracket may cause reduction or loss of support performance of the inlet mixer pipe. Such degradation of the support performance results in an increase of the clearance of the slip joint structure, i.e., an increase in a flow rate of the clearance flow, this eventually increasing possibility of the self-excited vibration.

Conventionally, vibration restraining techniques for jet pumps listed below have been known.

(1) A reinforcing hardware for restraining vibration and wear is provided in an interconnection portion between a wedge and a riser bracket (for example, see Patent Document 1).

(2) A clearance adjuster is provided which eliminates a clearance defined by a riser bracket and an inlet mixer pipe to restrain vibration (for example, see Patent Documents 2 and 3).

(3) A fastener is provided, by which an inlet mixer pipe and a diffuser pipe are press-contacted to each other to restrain vibration (for example, see Patent Document 4).

(4) A member for eliminating a clearance flow is interposed in a clearance between an inlet mixer pipe and a slip joint structure connecting the inlet mixer pipe with a diffuser pipe (see Patent Document 5).

(Patent Document 1) U.S. Pat. No. 6,052,425
(Patent Document 2) Japanese Patent Laid-Open No. 2001-249196
(Patent Document 3) Japanese Patent Laid-Open No. 2003-161795
(Patent Document 4) U.S. Pat. No. 6,394,765
(Patent Document 5) U.S. Pat. No. 6,438,192

Each of the vibration restraining techniques described in Patent Documents 1 to 3 includes a vibration restraining structure at a location away from the connection portion between the inlet mixer pipe and the diffuser pipe. Each of such vibration restraining structures is not intended to directly restrain the self-excited vibration due to the clearance flow described above, so that a restraint effect of the self-excited vibration decreases with distance between the vibration restraining structure and the connection portion between the inlet mixer pipe and the diffuser pipe.

In the vibration restraining technique described in Patent Document 4, the inlet mixer pipe and the diffuser pipe are press-contacted to each other by an external force applied thereto. In the vibration restraining technique described in Patent Document 5, the clearance defined by the inlet mixer pipe and the diffuser pipe is eliminated. Therefore, in each of the vibration restraining techniques, a function of the clearance for accommodating a structural deformation due to e.g. thermal expansion of the inlet mixer or the diffuser pipe is inhibited, as well as mechanical deterioration is caused.

The present invention is made in view of the above circumstances, and has an object to provide a jet pump, and a method for restraining vibration of the jet pump, which can restrain self-excited vibration in a connection portion between an inlet mixer pipe and a diffuser pipe without inhibiting a structural deformation due to thermal expansion and the like.

According to one embodiment, a jet pump disposed in a reactor pressure vessel of a boiling water reactor, the jet pump including an inlet mixer pipe connected to a riser pipe, and a diffuser pipe connected to the inlet mixer pipe to cause a forced circulation of coolant water in the reactor pressure vessel, the jet pump includes: a slip joint structure connecting the inlet mixer pipe and the diffuser pipe to each other by inserting the inlet mixer pipe into an upper end opening of the diffuser pipe with a clearance left therebetween; and a self vibration damping structure configured such that when the clearance defined by an outer pipe wall of the inlet mixer pipe and an inner pipe wall of the diffuser pipe is widening or narrowing due to vibration of the inlet mixer pipe or the diffuser pipe, a flow path resistance inside a clearance flow path for pumped coolant water defined by the clearance is not smaller than a fluid inertia force all over the clearance flow path.

According to another embodiment, a jet pump disposed in a reactor pressure vessel of a boiling water reactor, the jet pump including an inlet mixer pipe connected to a riser pipe, and a diffuser pipe connected to the inlet mixer pipe to cause a forced circulation of coolant water in the reactor pressure vessel, the jet pump includes: a slip joint structure connecting the inlet mixer pipe and the diffuser pipe to each other by inserting the inlet mixer pipe into an upper end opening of the diffuser pipe with a clearance left therebetween; and a self vibration damping structure including a groove portion provided on any one side of an outer pipe wall of the inlet mixer pipe and an inner pipe wall of the diffuser pipe, and a convex portion provided on the other side and being fit into the groove portion with a minute clearance left therebetween.

According to another embodiment, a jet pump disposed in a reactor pressure vessel of a boiling water reactor, the jet pump including an inlet mixer pipe connected to a riser pipe, and a diffuser pipe connected to the inlet mixer pipe to cause a forced circulation of coolant water in the reactor pressure vessel, the jet pump includes: a non-slip joint structure connecting the inlet mixer pipe and the diffuser pipe to each other by abutting an opening edge of the inlet mixer pipe against an opening edge of the diffuser pipe.

According to another embodiment, A method for restraining vibration of a jet pump disposed in a reactor pressure vessel of a boiling water reactor, in which an inlet mixer pipe and a diffuser pipe are connected to each other by inserting the inlet mixer pipe into an upper end opening of the diffuser pipe with a clearance left therebetween, to cause a forced circulation of coolant water in the reactor pressure vessel, the method including: controlling a flow of a clearance flow such that when the clearance defined by an outer pipe wall of the inlet mixer pipe and an inner pipe wall of the diffuser pipe is widening or narrowing due to vibration of the inlet mixer pipe or the diffuser pipe, a flow path resistance inside a clearance flow path for pumped coolant water defined by the clearance is not smaller than a fluid inertia force all over the clearance flow path.

These embodiments of present invention can restrain self-excited vibration in a connection portion between an inlet mixer pipe and a diffuser pipe without inhibiting a structural deformation due to thermal expansion and the like.

DETAILED DESCRIPTION

Embodiments of a jet pump according to the present invention and methods for restraining vibration of the jet pump will be described with reference to the accompanying drawings.

First Embodiment

Figure 1:
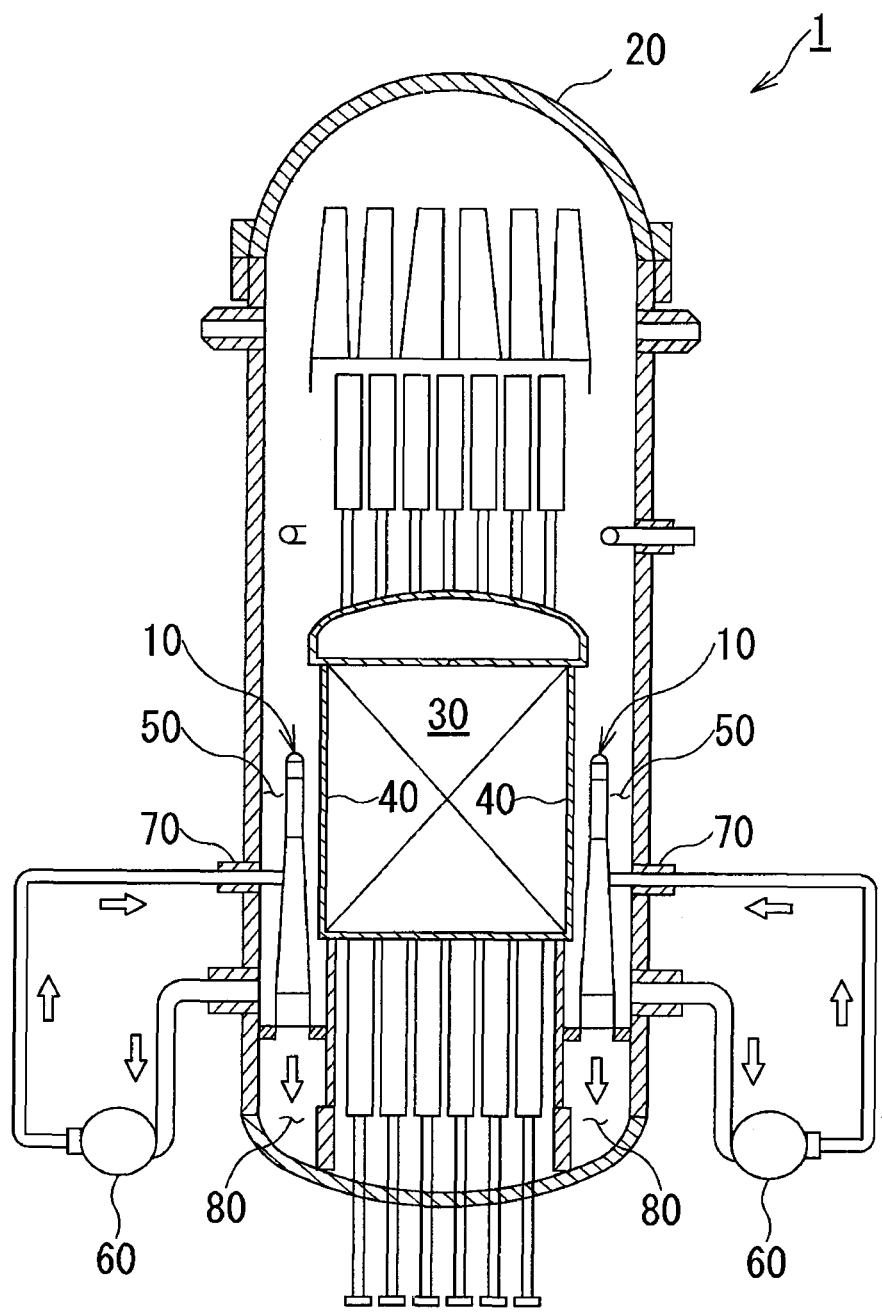
FIG. 1 is a view showing a first embodiment of a jet pump according to the present invention.
Figure 2:
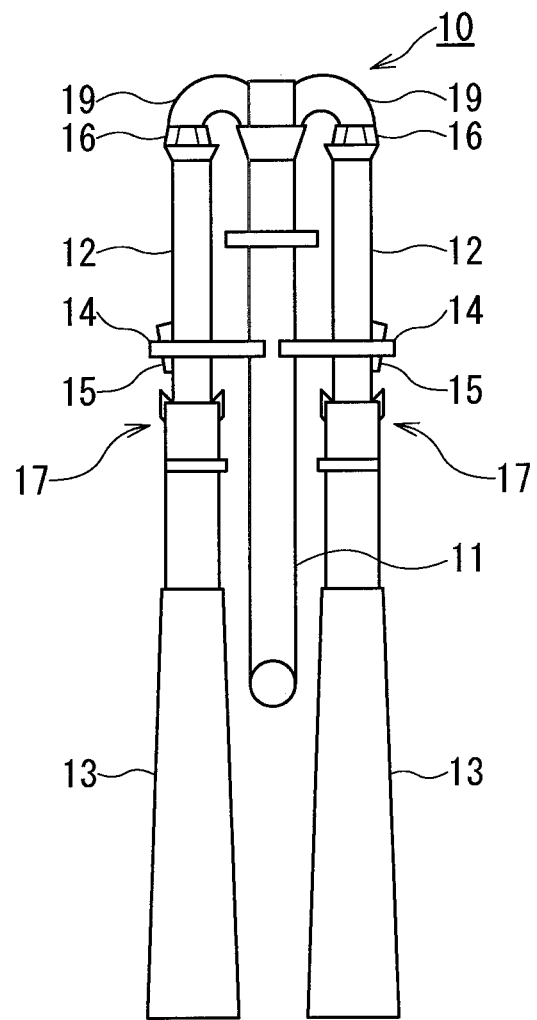
FIG. 2 is a view showing the first embodiment of the jet pump according to the present invention.

FIGS. 1 and 2 are views showing a first embodiment of a jet pump according to the present invention. FIG. 1 is a view showing an arrangement of the jet pump, and FIG. 2 is a view showing a structure of the jet pump.

A jet pump 10 of this embodiment, as shown in FIG. 1, is disposed in a clearance (a so-called downcomer region 50) defined by an inner reactor wall of a reactor pressure vessel 20 and a shroud 40 surrounding a reactor core 30 in a boiling water reactor 1. The jet pump 10 takes in coolant water from a recirculation inlet nozzle 70 via a recirculation pump 60 and discharges the coolant water to a lower plenum 80, thereby causing a forced circulation of the coolant water within the reactor pressure vessel 20. Note that outline arrows in FIG. 1 indicates a direction of coolant flow.

The jet pump 10, as shown in FIG. 2, comprises a riser pipe 11 through which the coolant water fed from the recirculation inlet nozzle 70 (FIG. 1) is raised, an elbow pipe 19 directing the raised coolant water downward, an inlet mixer pipe 12 conducting the coolant water, fed from a nozzle port of the elbow pipe 19, downward while involving reactor water, and a diffuser pipe 13 ejecting the coolant water into the lower plenum 80 (FIG. 1). Referring to reference numerals in FIG. 2, the numeral 14 denotes a riser bracket fixing the riser pipe 11 and the inlet mixer pipe 12 relative to each other; the numeral 15 denotes a wedge; and the numeral 17 denotes a connection portion between the inlet mixer pipe 12 and the diffuser pipe 13.

The jet pump 10 includes a slip joint structure and a self vibration damping structure in the connection portion 17 between the inlet mixer pipe 12 and the diffuser pipe 13.

Figure 3:
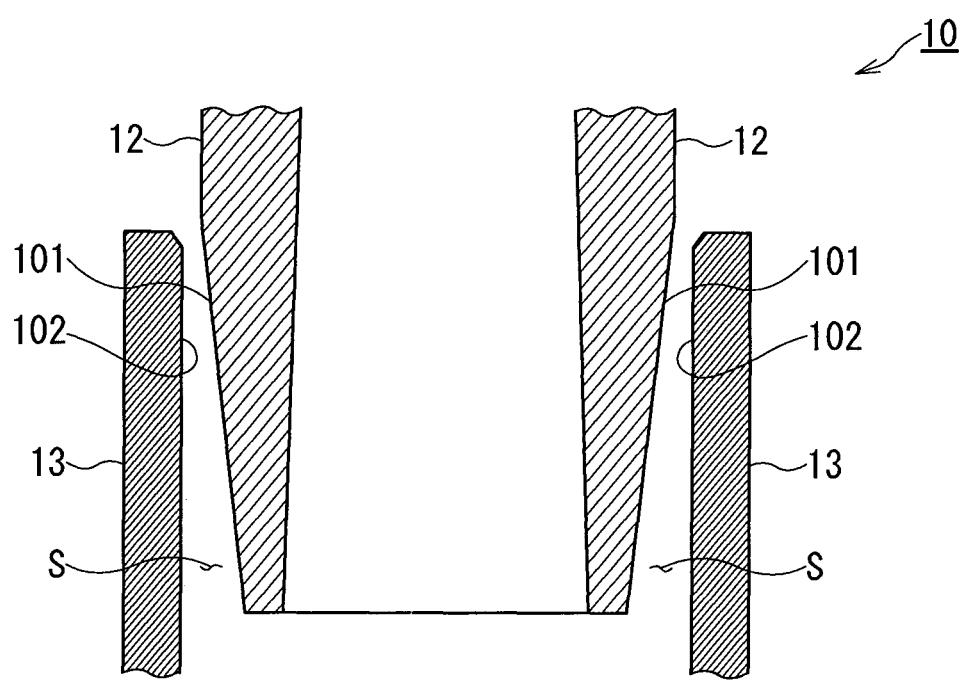
FIG. 3 is a view showing a slip joint structure and a self vibration damping structure in the jet pump of the first embodiment.

FIG. 3 is a view showing the slip joint structure and the self vibration damping structure in the jet pump 10 (longitudinal sectional layout view of the connection portion 17 shown in FIG. 1).

The slip joint structure is a structure in which the inlet mixer pipe 12 is inserted into an upper end opening of the diffuser pipe 13 with a clearance S left therebetween. The clearance S is provided in order to accommodate thermal expansion of the inlet mixer pipe 12 or the diffuser pipe 13, and leave adjusting allowance for use in installation.

The self vibration damping structure, as show in FIG. 3, includes a narrowing clearance flow path configured to gradually narrow the clearance S of the slip joint structure toward an upper end of the diffuser pipe 13. In other word, a clearance flow path defined by an outer pipe wall 101 of the inlet mixer pipe 12 and an inner pipe wall 102 of the diffuser pipe 13 is configured to be gradually narrow toward the upper end of the diffuser pipe 13. The narrowing clearance flow path may be provided throughout the entire region where the clearance S is formed, or otherwise may be formed in a region which extends upward from a midpoint along a vertical direction within the region where the clearance S is formed.

The narrowing clearance flow path of this embodiment is defined by the outer pipe wall 101 of the inlet mixer pipe 12 configured to gradually increase an outer diameter thereof with distance away from a lower end of the inlet mixer pipe 12, and the inner pipe wall 102 of the diffuser pipe 13 configured such that an inner diameter thereof is uniform.

An operation of the jet pump 10 will now be described.

Figure 4A:
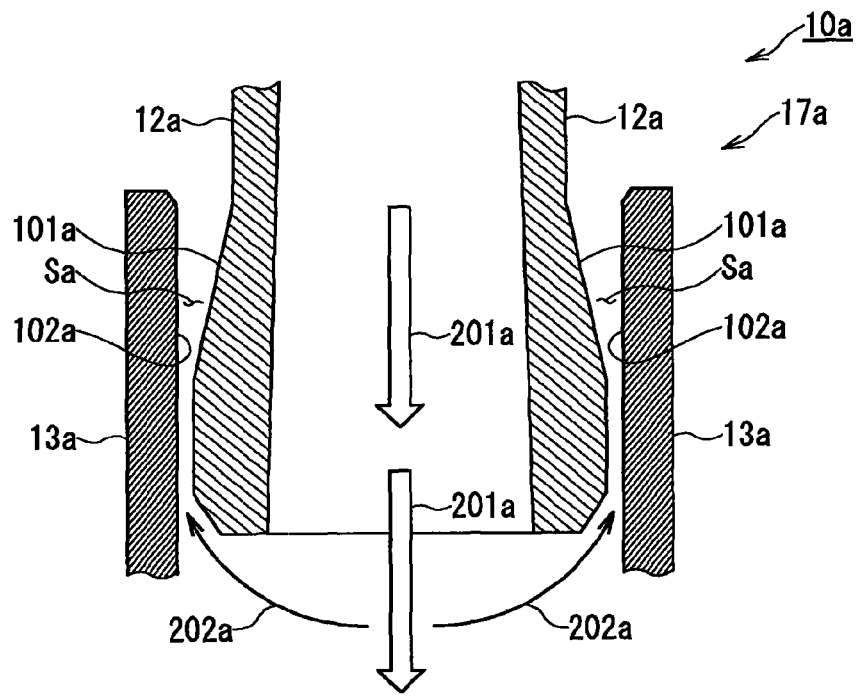
FIG. 4A is a view illustrating a conventional slip joint structure in a connection portion.
Figure 4B:
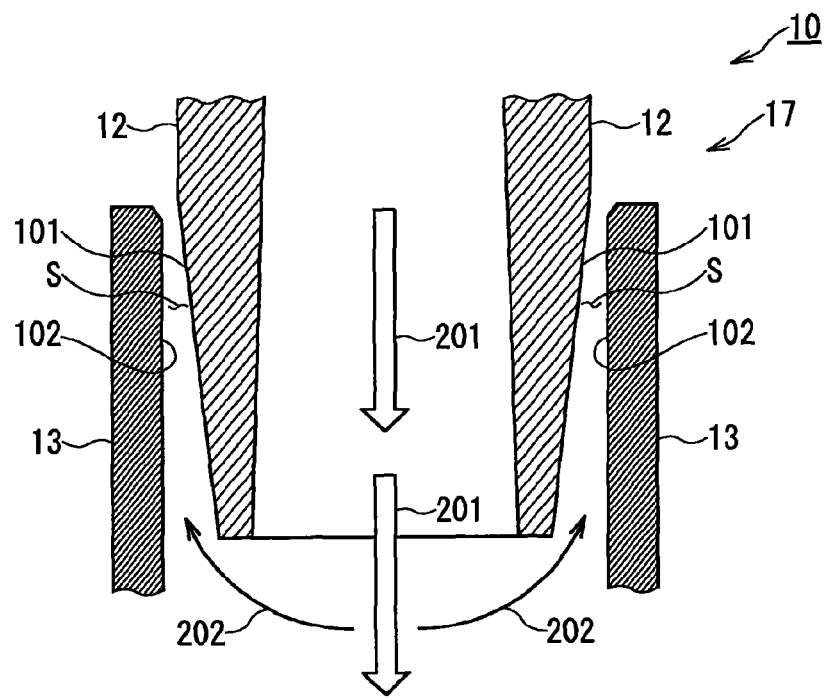
FIG. 4B is a view illustrating the operation of the jet pump of the first embodiment, which is a view illustrating a slip joint structure in a connection portion of this embodiment.
Figure 5:
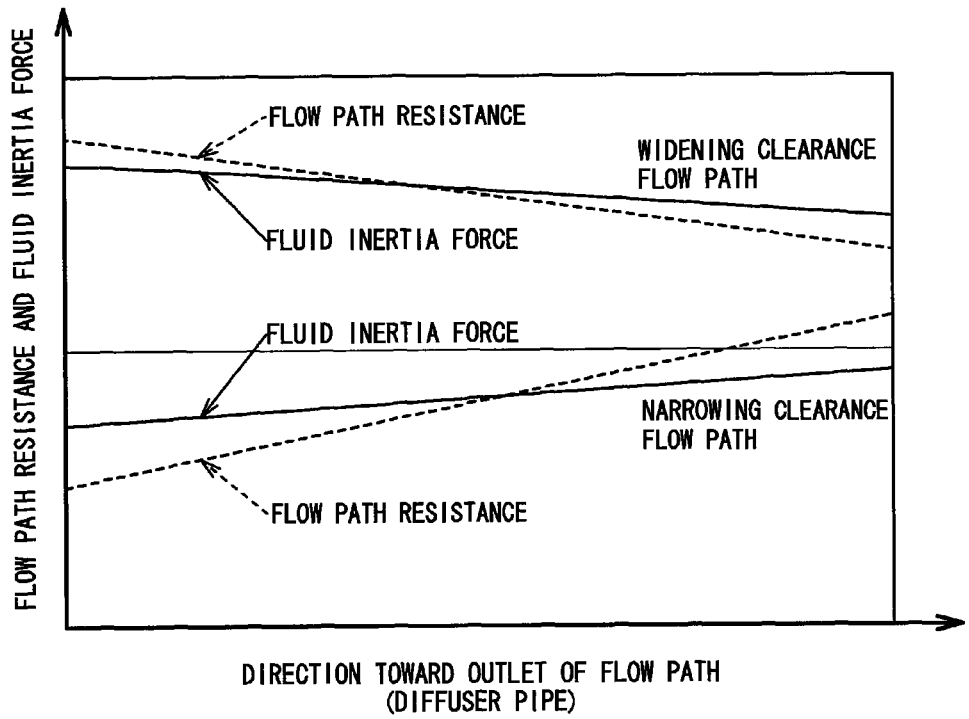
FIG. 5 is a graph illustrating the operation of the jet pump of the first embodiment.

FIGS. 4 and 5 are views illustrating an operation of the jet pump.

As shown in FIG. 4A, in a conventional jet pump 10a, a slip joint structure in a connection portion 17a between an inlet mixer pipe 12a and a diffuser pipe 13a is configured to gradually widen a clearance Sa thereof toward an upper end of the diffuser pipe 13a. In a clearance flow path for pumped coolant water defined by such clearance Sa (hereinafter, it is called a widening clearance flow path), both a flow path resistance and a fluid inertia force decrease toward an outlet, but the fluid inertia force is larger than the flow path resistance in a vicinity of the outlet, as shown in FIG. 5.

When the clearance Sa is widening, a flow rate increases since the flow path resistance decreases, and however the flow rate is not easily increase in the vicinity of the outlet since the fluid inertia force is relatively large compared to the flow path resistance. Thus, this result in the same effect as a fluid being forced into an inlet while an outlet being closed, thereby increasing a pressure within the clearance Sa. On the other hand, when the clearance Sa is narrowing, the flow rate decreases since the flow path resistance increase, and however the flow rate does not easily decrease in the vicinity of the outlet since the fluid inertia force is relatively large compared to the flow path resistance. Thus, this result in the same effect as a fluid being sucked from an outlet while an inlet being closed, thereby reducing a pressure within the clearance Sa.

Therefore, in the case of the widening clearance flow path, the pressure within the clearance Sa rises when the clearance Sa is widening, and the pressure within the clearance Sa drops when the clearance Sa is narrowing. For this reason, so to speak, a negative damping force acts on vibrations of the inlet mixer pipe 12a and the diffuser pipe 13a. As an actual phenomenon, a vibration having a large amplitude, referred to as self-excited vibration, may occur, which appears at the time when a clearance flow 202a exceeds a certain limiting value. It is noted that reference numeral 201a in FIG. 4A denotes a main flow of pumped coolant.

In contrast, in the jet pump 10 of this embodiment, as shown in FIG. 4B, the slip joint structure in the connection portion 17 between the inlet mixer pipe 12 and the diffuser pipe 13 is configured to gradually narrow the clearance S thereof toward the upper end of the diffuser pipe 13. In the clearance flow path, or the narrowing clearance flow path, for pumped coolant water defined by such clearance S, both a flow path resistance and a fluid inertia force increase toward an outlet, but the fluid inertia force is smaller than the flow path resistance in a vicinity of the outlet, as shown in FIG. 5.

When the clearance S is widening, a flow rate increases since the flow path resistance decreases, and however the flow rate easily increases in the vicinity of the outlet since the fluid inertia force is relatively small compared to the flow path resistance. Thus, this result in the same effect as a fluid being sucked from an outlet while an inlet being closed, thereby decreasing a pressure within the clearance S. On the other hand, when the clearance S is narrowing, the flow rate decreases since the flow path resistance increase, and the flow rate easily decreases in the vicinity of the outlet since the fluid inertia force is relatively small compared to the flow path resistance. Thus, this result in the same effect as a fluid being forced into the inlet while an outlet being closed, thereby increasing a pressure within the clearance S.

Therefore, in the narrowing clearance flow path, the pressure within the clearance S drops when the clearance S is widening, and the pressure within the clearance S rises when the clearance S is narrowing. For this reason, so to speak, a positive damping force acts on vibrations of the inlet mixer pipe 12 and the diffuser pipe 13. As an actual phenomenon, self-excited vibration is restrained, which appears at the time when a clearance flow 202 exceeds a certain limiting value. It is noted that reference numeral 201 in FIG. 4B denotes a main flow of pumped coolant.

Advantages of the jet pump 10 will then be described.

The jet pump 10 has the following advantages.

(1) The jet pump 10 includes: the slip joint structure connecting the inlet mixer pipe 12 and the diffuser pipe 13 to each other by inserting the inlet mixer pipe 12 into the upper end opening of the diffuser pipe 13 with the clearance S left therebetween; and the self vibration damping structure configured such that when the clearance S defined by the outer pipe wall 101 of the inlet mixer pipe 12 and the inner pipe wall 102 of the diffuser pipe 13 is widening or narrowing due to vibration of the inlet mixer pipe 12 or the diffuser pipe 13, the flow path resistance inside the clearance flow path for pumped coolant water defined by the clearance S is not smaller than the fluid inertia force all over the clearance flow path. Therefore, the self-excited vibration in a connection portion 17 between the inlet mixer pipe 12 and the diffuser pipe 13 may be restrained without inhibiting a structural deformation due to thermal expansion and the like.

(2) The self vibration damping structure includes the narrowing clearance flow path configured to gradually narrow the clearance S toward the upper end of the diffuser pipe 13. The narrowing clearance flow path is defined by the outer pipe wall 101 of the inlet mixer pipe 12 configured to gradually increase the outer diameter thereof with distance away from a lower end of the inlet mixer pipe 12, and the inner pipe wall 102 of the diffuser pipe 13 configured such that the inner diameter thereof is uniform. Therefore, it is possible to obtain the advantage (1), while simplifying the structure of the jet pump 10.

Second Embodiment

Figure 6:
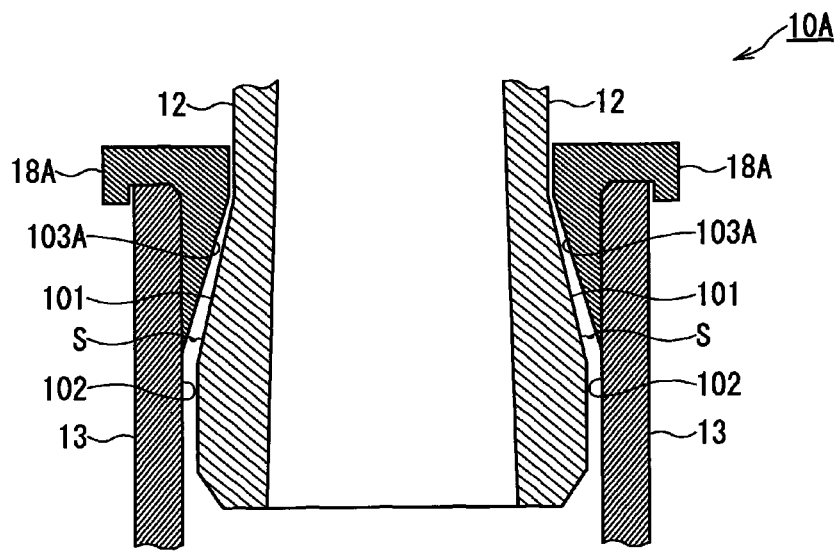
FIG. 6 is a view showing a second embodiment of the jet pump according to the present invention.

FIG. 6 is a view showing a second embodiment of the jet pump according to the present invention (a longitudinal sectional layout view of the connection portion 17 shown in FIG. 1). This embodiment is a modification of the self vibration damping structure in the jet pump 10 of the first embodiment. Hereinafter, the same elements as those of the first embodiment are referred to the same reference numerals to omit descriptions thereof. Elements obtained by modifying the elements of the first embodiment or adding a new element thereto are described by adding "A" at the end of the reference numerals.

A self vibration damping structure of this embodiment, like the first embodiment, includes a narrowing clearance flow path configured to gradually narrow a clearance S defined by an inlet mixer pipe 12 and a diffuser pipe 13 toward an upper end of the diffuser pipe 13. The narrowing clearance flow path of this embodiment, as shown in FIG. 6, is constituted using a slip joint clamp 18A.

The slip joint clamp 18A is provided so as to cover an opening edge of the diffuser pipe, and inserted into a clearance flow path for pumped coolant water. The narrowing clearance flow path is defined by an inner wall 103A of the slip joint clamp configured to gradually decrease an inner diameter thereof with distance away from a lower end of the slip joint clamp 18A, and an inner pipe wall 102 of the diffuser pipe 13. The narrowing clearance flow path may be provided throughout the entire region where the clearance S is formed, or otherwise may be formed in a region which extends upward from a midpoint along a vertical direction within the region where the clearance S is formed.

Figure 7A:
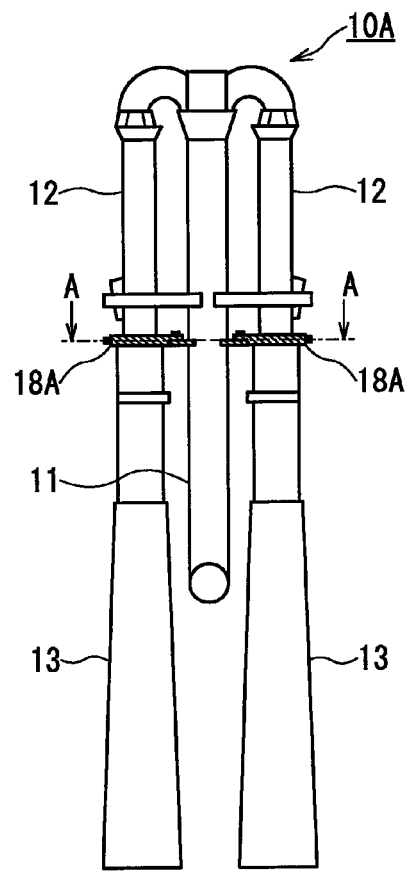
FIG. 7A is a view illustrating an exemplary fixation of a slip joint clamp in a jet pump of the second embodiment, which is a view showing a state of the slip joint clamp being fixed.
Figure 7B:
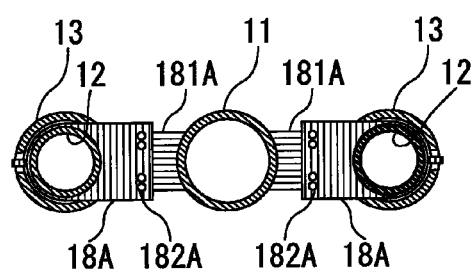
FIG. 7B is a view illustrating an exemplary fixation of the slip joint clamp in the jet pump of the second embodiment, which is a view showing a structure of an attachment of the slip joint clamp.

FIGS. 7A and 7B is a view illustrating an exemplary fixation of the slip joint clamp 18A, wherein FIG. 7A is a view showing a state of the slip joint clamp 18A being fixed, and FIG. 7B is a view showing a structure of an attachment of the slip joint clamp 18A.

The slip joint clamp 18A is fixed to the jet pump 10, e.g., to the riser pipe 11, as shown in FIG. 7A. Note that when the slip joint clamp 18A is fixed to the riser pipe 11, for example, the slip joint clamp 18A may be fixed in place using a fixing plate 181A, one side of which is fixed to the slip joint clamp 18A and the other side of which is fixed to the riser pipe 11, as shown in FIG. 7B. The slip joint clamp 18A and the fixing plate 181A may be fixed to each other using a fixing bolt 182A. An attachment and an attaching method are not specifically limited.

Advantages of a jet pump 10A will then be described.

The jet pump 10A may obtain the following advantage in addition to the advantage (1) of the first embodiment.

(3) The narrowing clearance flow path is defined by the inner wall 103A of the slip joint clamp configured to gradually decrease the inner diameter thereof with distance away from the lower end of the slip joint clamp 18A, and the inner pipe wall 102 of the diffuser pipe 13. Therefore, it is possible to obtain the advantage (1) of the first embodiment even in the case of a widening clearance flow path configured to gradually widen the clearance flow path for pumped coolant water defined by an outer pipe wall 101 of the inlet mixer pipe 12 and the inner pipe wall 102 of the diffuser pipe 13, toward an upper end of a diffuser pipe 13.

Third Embodiment

Figure 8A:
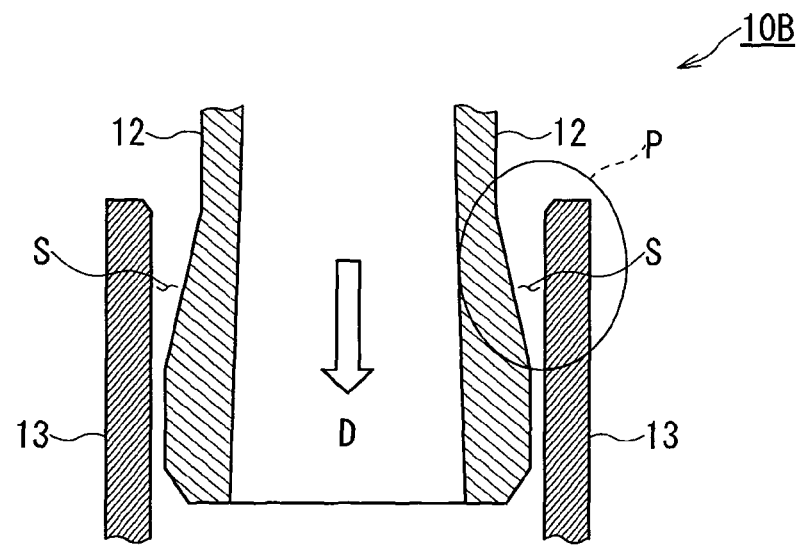
FIG. 8A is a view showing a third embodiment of the jet pump according to the present invention, which is a longitudinal sectional layout view of a connection portion (17) shown in FIG. 1.
Figure 8B:
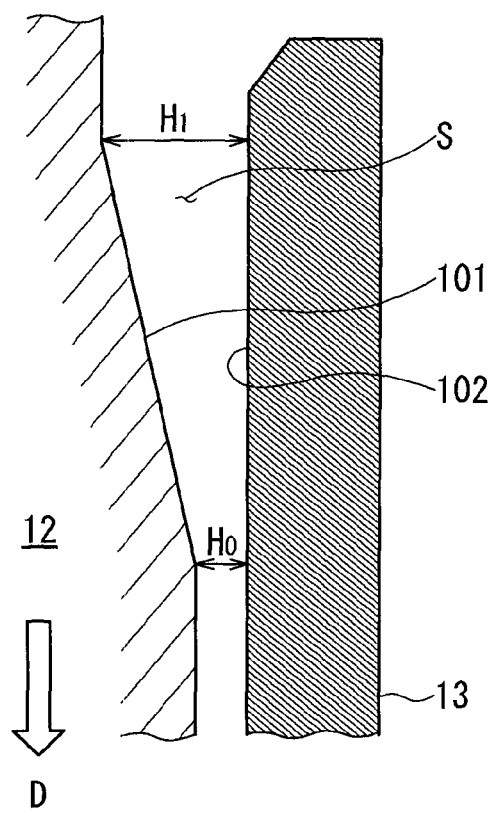
FIG. 8B is a view showing the third embodiment of the jet pump according to the present invention, which is an enlarged view of P area in FIG. 8A.

FIGS. 8A and 8B is a view showing a third embodiment of the jet pump according to the present invention, wherein FIG. 8A is a longitudinal sectional layout view of the connection portion 17 shown in FIG. 1, and FIG. 8B is an enlarged view of P area in FIG. 8A. This embodiment is a modification of the self vibration damping structure in the jet pump 10 of the first embodiment. Hereinafter, the same elements as those of the first embodiment are referred to by the same reference numerals to omit descriptions thereof. Elements obtained by modifying the elements of the first embodiment or adding a new element thereto are described by adding "B" at the end of the reference numerals.

As shown in FIG. 8B, in a self vibration damping structure of this embodiment, a clearance flow path for pumped coolant water defined by an outer pipe wall 101 of an inlet mixer pipe 12 and an inner pipe wall 102 of a diffuser pipe 13 has a minimum clearance flow path width H0 on a downstream side in a coolant water pumping direction D, and a maximum clearance flow path width H1 on an upstream side in the coolant water pumping direction D. Further, when a (a flow path magnification factor) is defined as follows:

α=(H1−H0)÷H0, the clearance flow path is configured to meet α≤1. It is noted that this embodiment illustrates an exemplary configuration of a widening clearance flow path designed to gradually widen a clearance S toward an upper end of the diffuser pipe 13.

An operation of a jet pump 10B will now be described.

Figure 9:
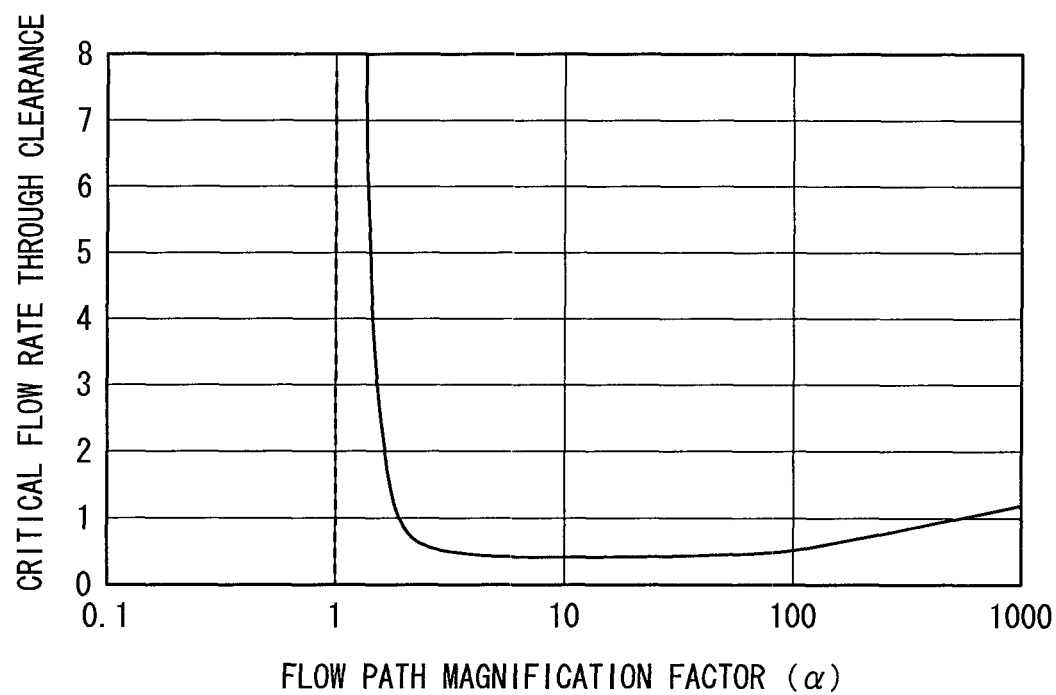
FIG. 9 is a view illustrating an operation of a jet pump of the third embodiment.

FIG. 9 is a view illustrating an operation of the jet pump 10B, which is a graph showing a critical flow rate through the clearance, at which the self-excited vibration occurs, in the widening clearance flow path, predicted by analysis using the flow path magnification factor α as a parameter. In FIG. 9, a horizontal axis shows the flow path magnification factor α plotted as logarithm, and a vertical axis shows the critical flow rate through the clearance. The critical flow rate through the clearance is a flow rate at which the self-excited vibration easily occurs. As is obvious from an analysis result shown in FIG. 9, when the flow path magnification factor α is not more than 1, the critical flow rate through the clearance is extremely increased, and it is found that the self-excited vibration does not easily occur even when the clearance flow path for pumped coolant water is the widening clearance flow path.

Advantages of the jet pump 10B will then be described.

The jet pump 10B may obtain the following advantage in addition to the advantage (1) of the first embodiment.

(4) The self vibration damping structure has a configuration in which the clearance flow path for pumped coolant water defined by the outer pipe wall 101 of the inlet mixer pipe 12 and the inner pipe wall 102 of the diffuser pipe 13 has the minimum clearance flow path width H0 on the downstream side in the coolant water pumping direction D, and the maximum clearance flow path width H1 on the upstream side in the coolant water pumping direction D, as well as is configured to meet (H1−H0)÷H0≤1. Therefore, it is possible to obtain the advantage (1) of the first embodiment even in the case of a widening clearance flow path configured to gradually widen the clearance flow path for pumped coolant water defined by the outer pipe wall 101 of the inlet mixer pipe 12 and the inner pipe wall 102 of the diffuser pipe 13 toward the upper end of the diffuser pipe 13.

Fourth Embodiment

Figure 10A:
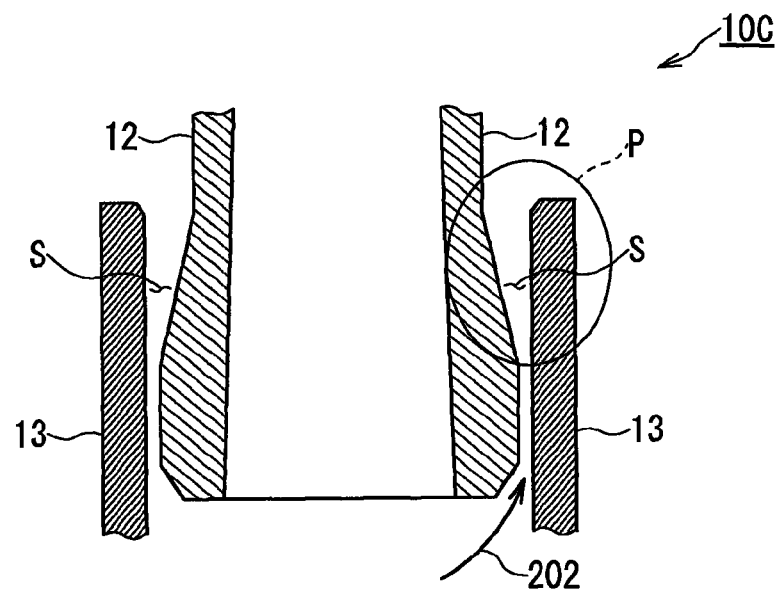
FIG. 10A is a view showing a fourth embodiment of the jet pump according to the present invention, which is a longitudinal sectional layout view of the connection portion (17) shown in FIG. 1.
Figure 10B:
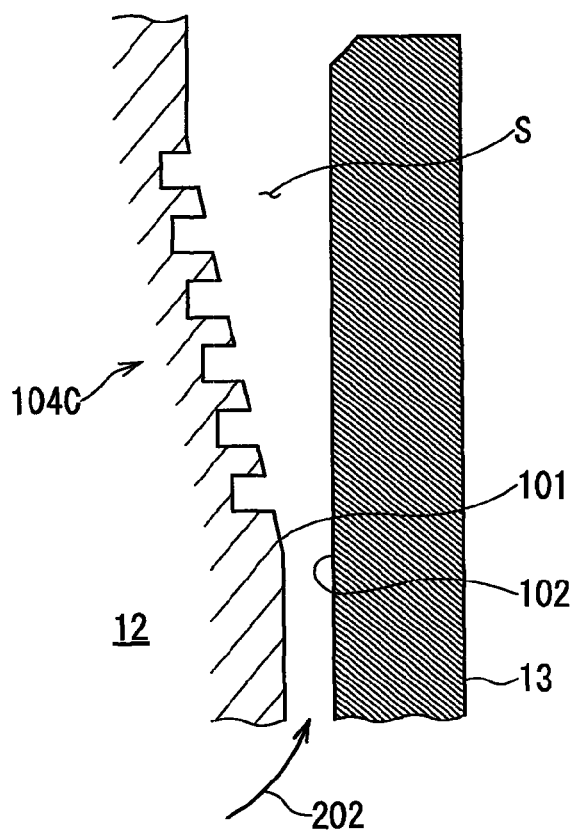
FIG. 10B is a view showing the fourth embodiment of the jet pump according to the present invention, which is an enlarged view of P area in FIG. 10A.

FIGS. 10A and 10B is a view showing a fourth embodiment of the jet pump according to the present invention, wherein FIG. 10A is a longitudinal sectional layout view of the connection portion 17 shown in FIG. 1, and FIG. 10B is an enlarged view of P area in FIG. 10A. This embodiment is a modification of the self vibration damping structure in the jet pump 10 of the first embodiment. Hereinafter, the same elements as those of the first embodiment are referred to by the same reference numerals to omit descriptions thereof. Elements obtained by modifying the elements of the first embodiment or adding a new element thereto are described by adding "C" at the end of the reference numerals.

A self vibration damping structure of this embodiment, as shown in FIG. 10B, comprises a labyrinth structure 104C provided on an outer pipe wall 101 of an inlet mixer pipe 12 and to form a turbulent flow in a clearance flow 202 flowing through a clearance S between the inlet mixer pipe 12 and a diffuser pipe 13. It is noted that this embodiment illustrates an exemplary configuration of a widening clearance flow path designed to gradually widen the clearance S toward an upper end of the diffuser pipe 13. The labyrinth structure 104C has a lot of grooves which are formed on a periphery of the outer pipe wall 101 of the inlet mixer pipe 12. Note that it is only necessary for the grooves of the labyrinth structure 104C to be designed to turn the clearance flow 202 into the turbulent flow, and a shape and the number of the labyrinth structure 104C are not specifically limited. In addition, depths of the grooves are not specifically limited, and not required to be equal.

Advantages of a jet pump 10C will then be described.

The jet pump 10C may obtain the following advantage in addition to the advantage (1) of the first embodiment.

(5) The self vibration damping structure comprises the labyrinth structure 104C provided on the outer pipe wall 101 of the inlet mixer pipe 12. Therefore, when the clearance S is repeatedly widened and narrowed due to vibration of the inlet mixer pipe 12 and the like, the clearance flow 202 efficiently changes into a turbulent flow, resulting in a flow which does not easily cause self-excited vibration. Thus, it is possible to obtain the advantage (1) of the first embodiment even in the case of a widening clearance flow path configured to gradually widen a clearance flow path for pumped coolant water defined by the outer pipe wall 101 of the inlet mixer pipe 12 and an inner pipe wall 102 of the diffuser pipe 13 toward the upper end of the diffuser pipe 13.

Fifth Embodiment

Figure 11A:
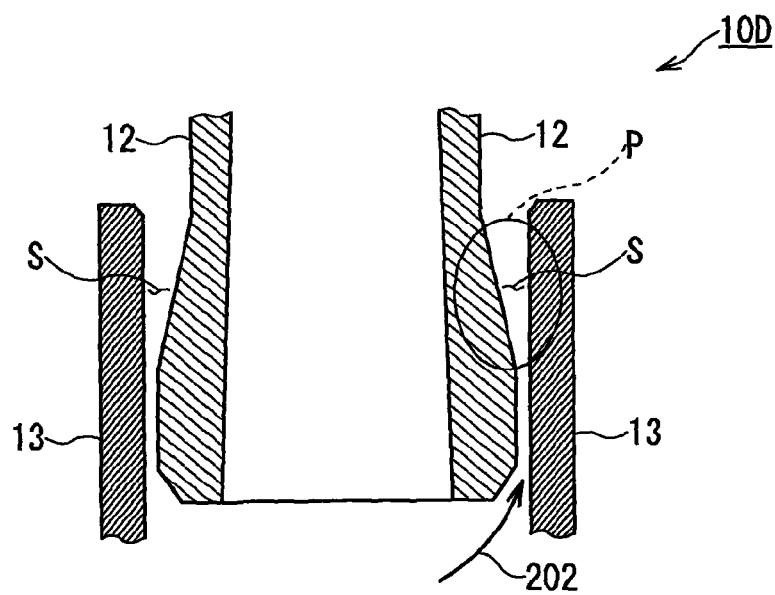
FIG. 11A is a view illustrating a fifth embodiment of the jet pump according to the present invention, which is a longitudinal sectional layout view of the connection portion (17) shown in FIG. 1.
Figure 11B:
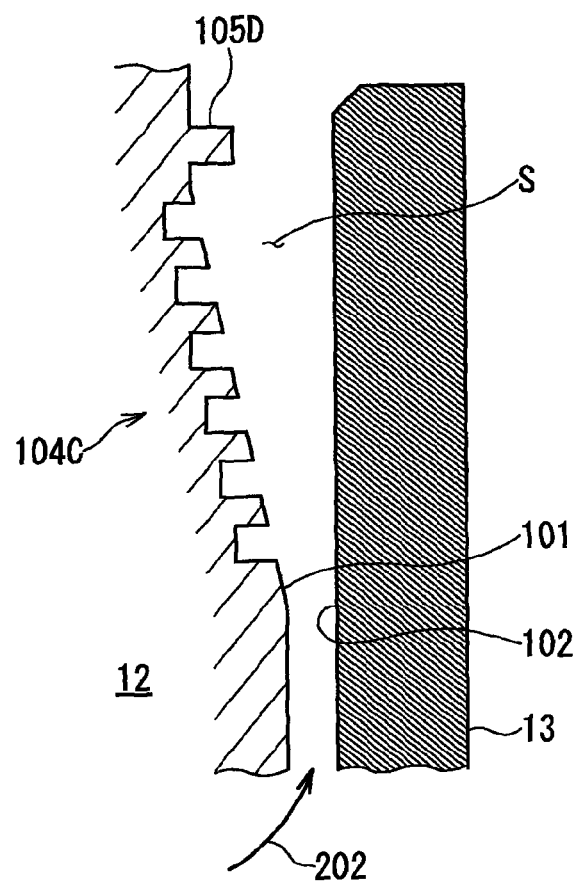
FIG. 11B is a view showing the fifth embodiment of the jet pump according to the present invention, which is an enlarged view of P area in FIG. 11A.

FIGS. 11A and 11B is a view showing a fifth embodiment of the jet pump according to the present invention, wherein FIG. 11A is a longitudinal sectional layout view of the connection portion 17 shown in FIG. 1, and FIG. 11B is an enlarged view of P area in FIG. 11A. This embodiment is a modification of the self vibration damping structure in the jet pump 10C of the fourth embodiment. Hereinafter, the same elements as those of the fourth embodiment are referred to by the same reference numerals to omit descriptions thereof. Elements obtained by modifying the elements of the fourth embodiment or adding a new element thereto are described by adding "D" at the end of the reference numerals.

A self vibration damping structure of this embodiment, as shown in FIG. 11B, comprises a ridge structure 105D. The ridge structure 105D is provided around a perimeter of an outer pipe wall 101 of an inlet mixer pipe 12, and is a structure that projects so as to block a clearance flow 202 flowing through a clearance flow path for pumped coolant water. Note that a shape, the number, and a size of the ridge structure 105D are not specifically limited. The ridge structure 105D may be partially provided on the outer pipe wall 101 of the inlet mixer pipe 12.

Advantages of a jet pump 10D will then be described.

The jet pump 10D may obtain the following advantage in addition to the advantage (1) of the first embodiment.

(6) The self vibration damping structure comprises the ridge structure 105D that protrudes into the clearance flow path for pumped coolant water so as to block the clearance flow 202 flowing through the flow path, and thus increases pressure loss in the clearance flow 202 in a vicinity of an outlet. Therefore, it is possible to obtain the advantage (1) of the first embodiment even in the case of a widening clearance flow path configured to gradually widen the clearance flow path for pumped coolant water toward an upper end of a diffuser pipe 13.

Sixth Embodiment

Figure 12:
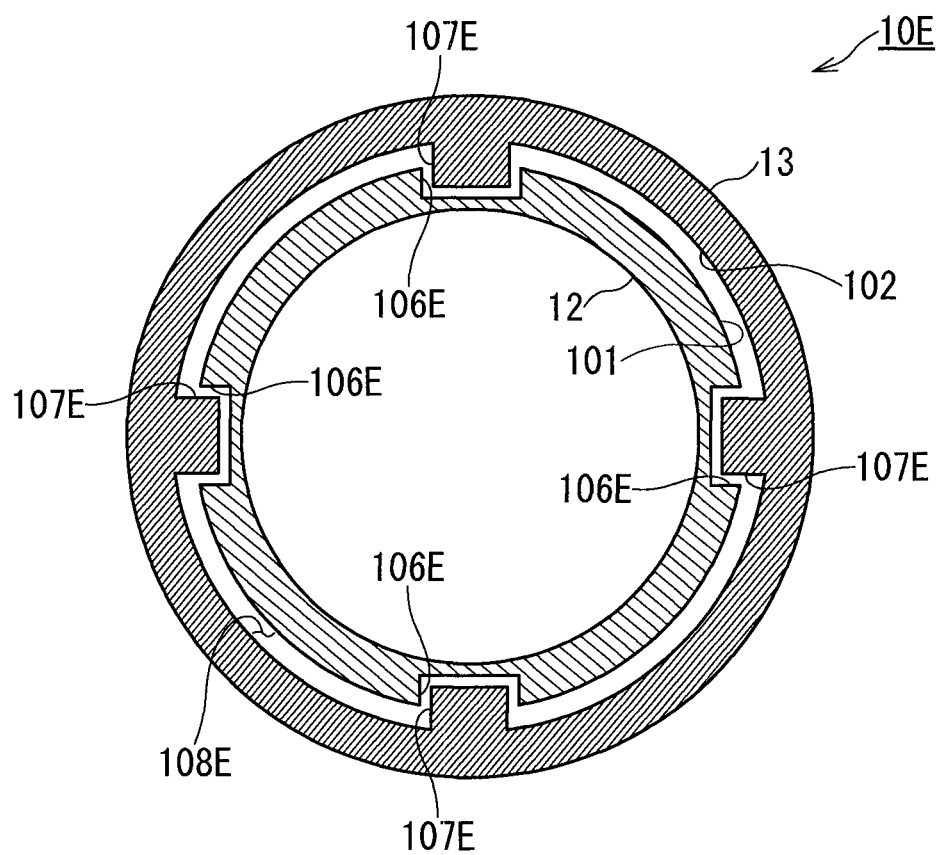
FIG. 12 is a view showing a sixth embodiment of the jet pump according to the present invention.

FIG. 12 is a view showing a sixth embodiment of the jet pump according to the present invention (a cross sectional layout view of the connection portion 17 shown in FIG. 1). This embodiment is a modification of the self vibration damping structure in the jet pump 10 of the first embodiment. Hereinafter, the same elements as those of the first embodiment are referred to by the same reference numerals to omit descriptions thereof. Elements obtained by modifying the elements of the first embodiment or adding a new element thereto are described by adding "E" at the end of the reference numerals.

As shown in FIG. 12, a self vibration damping structure of this embodiment comprises groove portions 106E provided on an outer pipe wall 101 of an inlet mixer pipe 12, and convex portions 107E provided on an inner pipe wall 102 of a diffuser pipe 13, each convex portion 107E being fit into each groove portion 106E with a minute clearance 108E left therebetween. Note that a shape, the number, and a size of the groove portions 106E and the convex portions 107E are not specifically limited.

Advantages of a jet pump 10E will then be described.

In the jet pump 10E, (7) The self vibration damping structure is configured such that the inlet mixer pipe 12 and the diffuser pipe 13 fit into each other with the minute clearance 108E maintained, and therefore vibration displacements of the inlet mixer pipe 12 and the diffuser pipe 13 are permitted only within the minute clearance 108E. Therefore, self-excited vibration in the connection portion 17 between the inlet mixer pipe 12 and the diffuser pipe 13 can be restrained without inhibiting a structural deformation due to thermal expansion, and the like.

Seventh Embodiment

Figure 13:
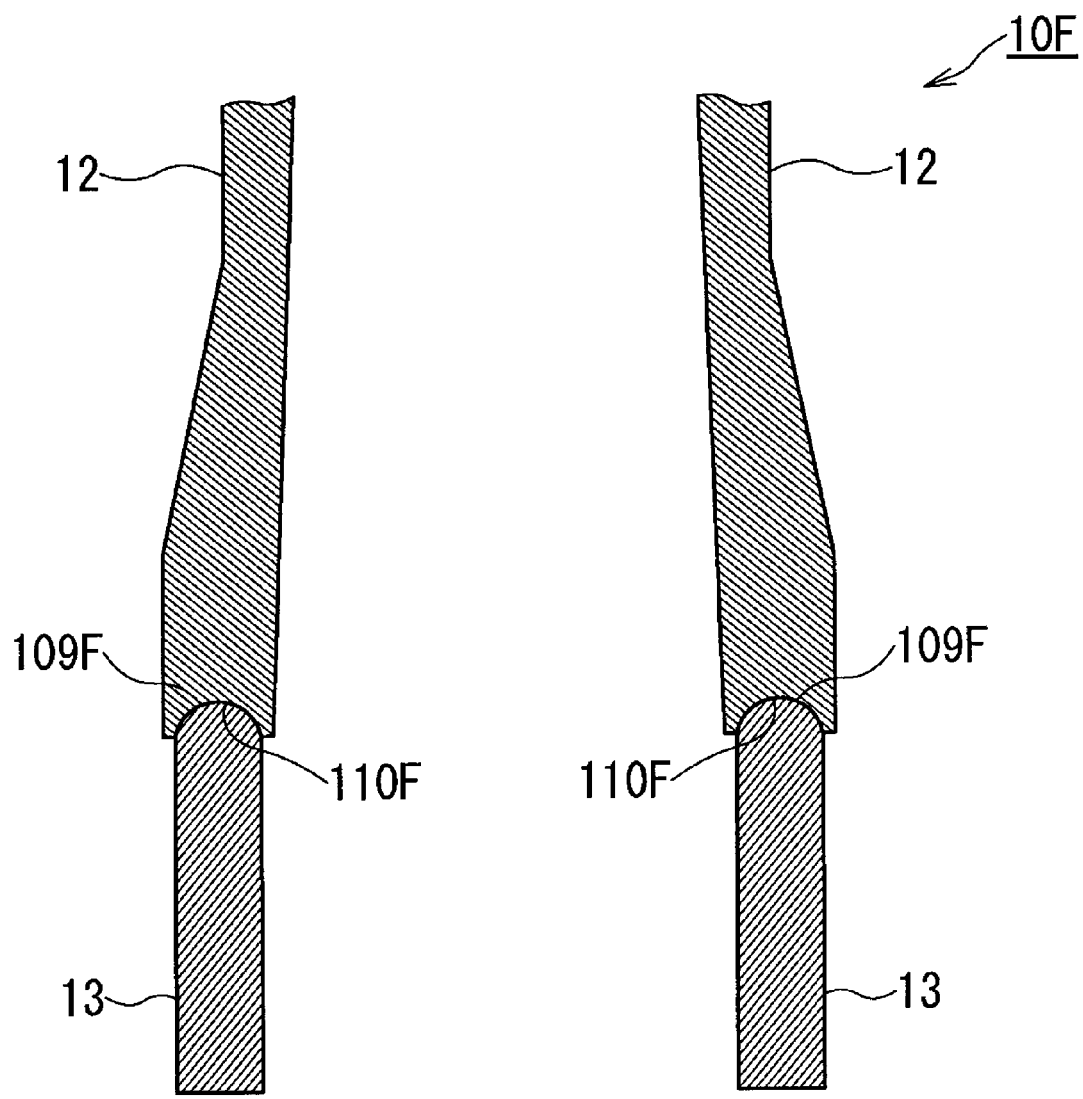
FIG. 13 is a view showing a seventh embodiment of the jet pump according to the present invention.

FIG. 13 is a view showing a seventh embodiment of the jet pump according to the present invention (a longitudinal sectional layout view of the connection portion 17 shown in FIG. 1). This embodiment is a modification of the connection structure between the inlet mixer pipe 12 and the diffuser pipe 13 in the jet pump 10 of the first embodiment. Hereinafter, the same elements as those of the first embodiment are referred to by the same reference numerals to omit descriptions thereof. Elements obtained by modifying the elements of the first embodiment or adding a new element thereto are described by adding "F" at the end of the reference numerals.

A connection structure between an inlet mixer pipe 12 and a diffuser pipe 13 in a jet pump 10F of this embodiment is a non-slip joint structure. Thus, as shown in FIG. 13, an opening edge of the inlet mixer pipe 12 abuts with an opening edge of the diffuser pipe 13 to connect the inlet mixer pipe 12 and the diffuser pipe 13 to each other. Further, the opening edge of the inlet mixer pipe 12 is formed into a concave sphere 109F, and the opening edge of the diffuser pipe 13 is formed into a convex sphere 110F which receives the opening edge of the inlet mixer pipe 12.

Advantages of the jet pump 10F will then be described.

In the jet pump 10F, (8) the inlet mixer pipe 12 and the diffuser pipe 13 are connected using the non-slip joint structure, so that the clearance flow 202 as described in the first embodiment is not generated. Moreover, the opening edges of the inlet mixer pipe 12 and the diffuser pipe 13 have a so-called spherical seat structure, so that structural displacements thereof in radial and longitudinal directions due to thermal expansion are less limited. Therefore, self-excited vibration in the connection portion 17 between the inlet mixer pipe 12 and the diffuser pipe 13 can be can restrained without inhibiting a structural deformation due to thermal expansion, and the like.

Eighth Embodiment

Figure 14:
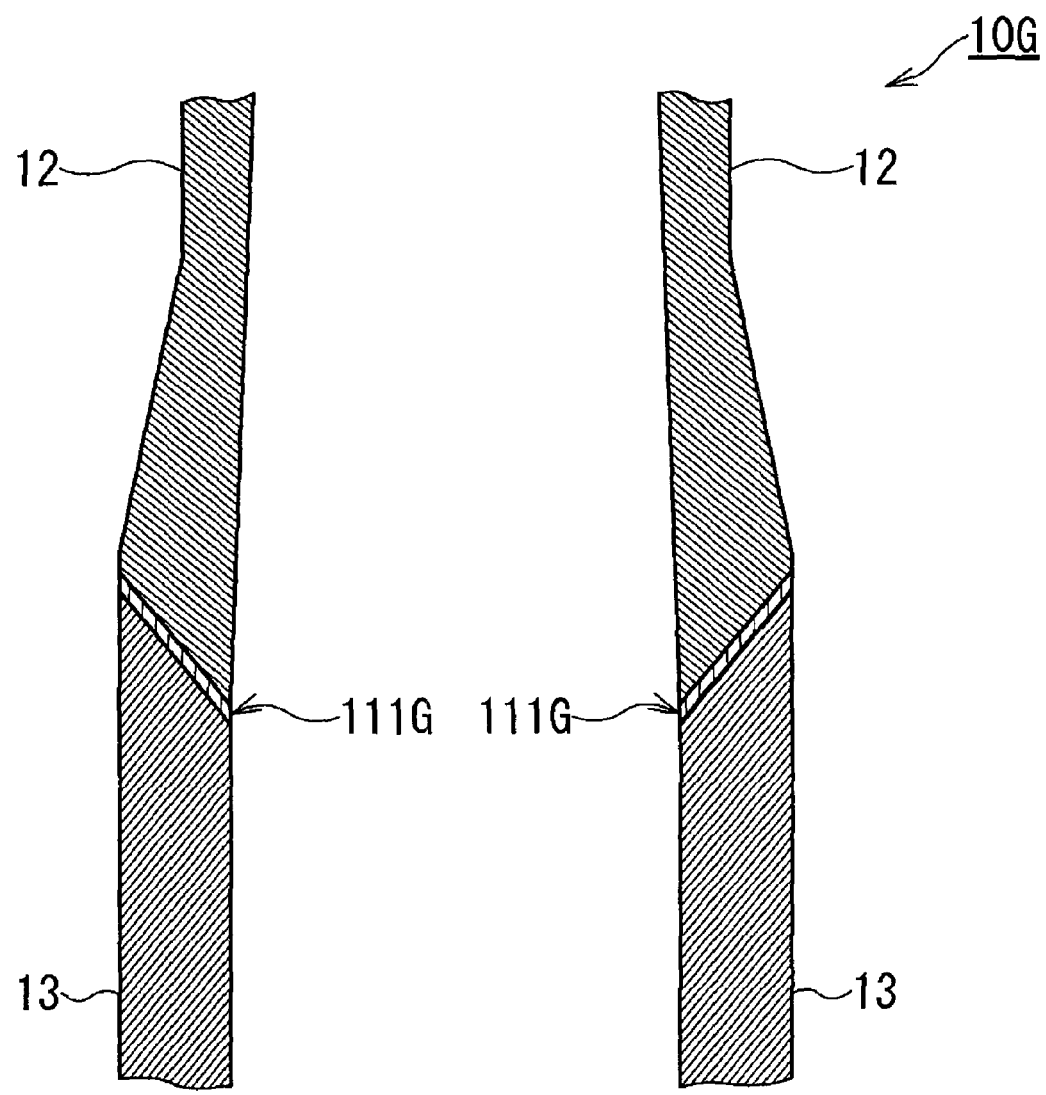
FIG. 14 is a view showing an eighth embodiment of the jet pump according to the present invention.

FIG. 14 is a view showing an eighth embodiment of the jet pump according to the present invention (a longitudinal sectional layout view of the connection portion 17 shown in FIG. 1). This embodiment is a modification of the connection structure between the inlet mixer pipe 12 and the diffuser pipe 13 in the jet pump 10F of the seventh embodiment. Hereinafter, the same elements as those of the seventh embodiment are referred to by the same reference numerals to omit descriptions thereof. Elements obtained by modifying the elements of the seventh embodiment or adding a new element thereto are described by adding "G" at the end of the reference numerals.

In a connection structure between the inlet mixer pipe 12 and the diffuser pipe 13 in a jet pump 10G of this embodiment, a metal seal portion 111G is interposed between opening edges of the inlet mixer pipe 12 and the diffuser pipe 13, as shown in FIG. 14. Further, the opening edges of the inlet mixer pipe 12 and the diffuser pipe 13, between which the metal seal portion 111G is interposed, are inclined. The metal seal portion 111G is made of a material having hardness that is lower than hardness of the inlet mixer pipe 12 or the diffuser pipe 13. It is noted that the metal seal portion 111G may be integrated with the structure of the inlet mixer pipe 12 or the diffuser pipe 13.

Advantages of the jet pump 10G will then be described.

The jet pump 10G may obtain the following advantage in addition to the advantage (8) of the seventh embodiment.

(9) The metal seal portion 111G is interposed between an opening edge 109F of the inlet mixer pipe 12 and the opening edge of the diffuser pipe 13, and such both opening edges are inclined. Therefore, it is possible to obtain the advantage (8) of the seventh embodiment, while effectively ensuring adjusting allowance, in thermal expansion and interconnection, in radial and longitudinal directions.

The jet pump of the present invention has been described above based upon first to eighth embodiments. Specific constitutions thereof are not limited to these embodiments, but design change, addition and the like may be made without departing from the spirit and scope of the invention.

Figure 15:
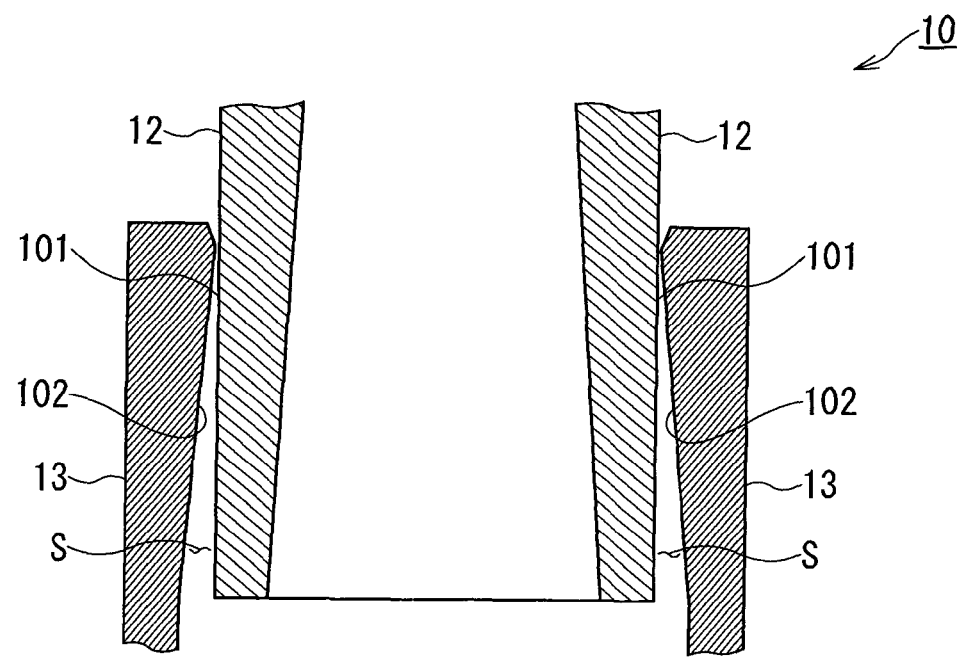
FIG. 15 is a view showing a first variation of the jet pump of the first embodiment.

For example, the narrowing clearance flow path of the first embodiment, as shown in FIG. 15, may be defined by an inner pipe wall 102 of the diffuser pipe 13 configured to gradually increase an inner diameter thereof with distance away from an upper end of the diffuser pipe 13, and an outer pipe wall 101 of the inlet mixer pipe 12 configured such that an outer diameter thereof is uniform.

Figure 16:
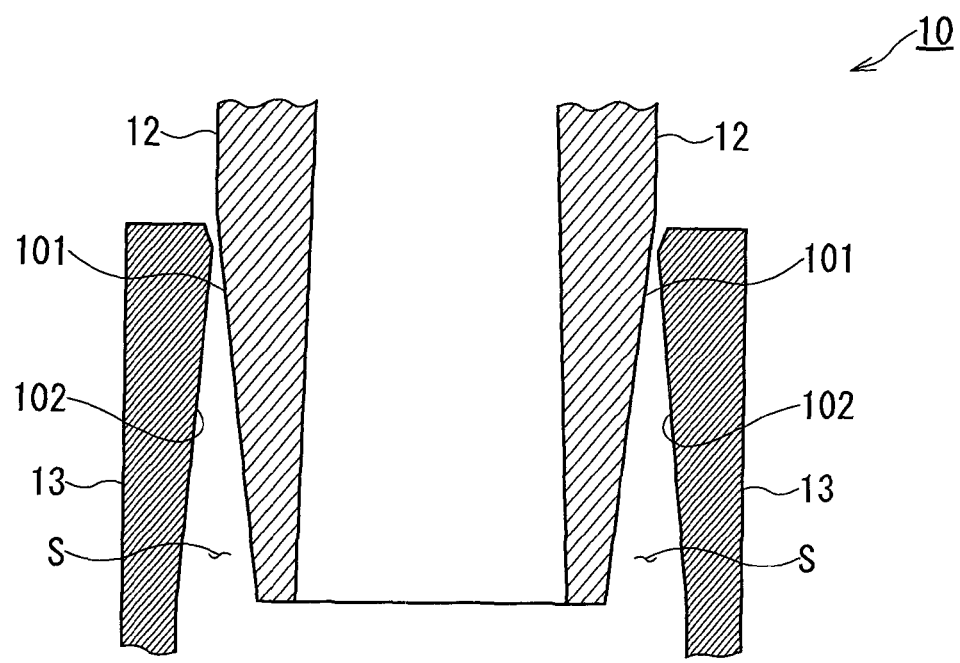
FIG. 16 is a view showing a second variation of the jet pump of the first embodiment.

Also, the narrowing clearance flow path of the first embodiment, as shown in FIG. 16, may be defined by the outer pipe wall 101 of the inlet mixer pipe 12 configured to gradually increase an outer diameter thereof with distance away from the lower end of the inlet mixer pipe 12, and an inner pipe wall 102 of the diffuser pipe 13 configured to gradually increase an inner diameter thereof with distance away from an upper end of the diffuser pipe 13. Alternatively, the narrowing clearance flow path may be defined by an outer pipe wall 101 of the inlet mixer pipe 12 configured such that an outer diameter thereof is uniform, and the inner pipe wall 102 of the diffuser pipe 13 configured such that an inner diameter thereof is uniform. In any form, when the clearance S defined by the inlet mixer pipe 12 and the diffuser pipe 13 is widening or narrowing due to vibration, the flow path resistance within the clearance flow path for pumped coolant water defined by the clearance S is not smaller than the fluid inertia force all over the clearance flow path. Therefore, it is possible to obtain the same advantage as the advantage (1) of the first embodiment.

Figure 17:
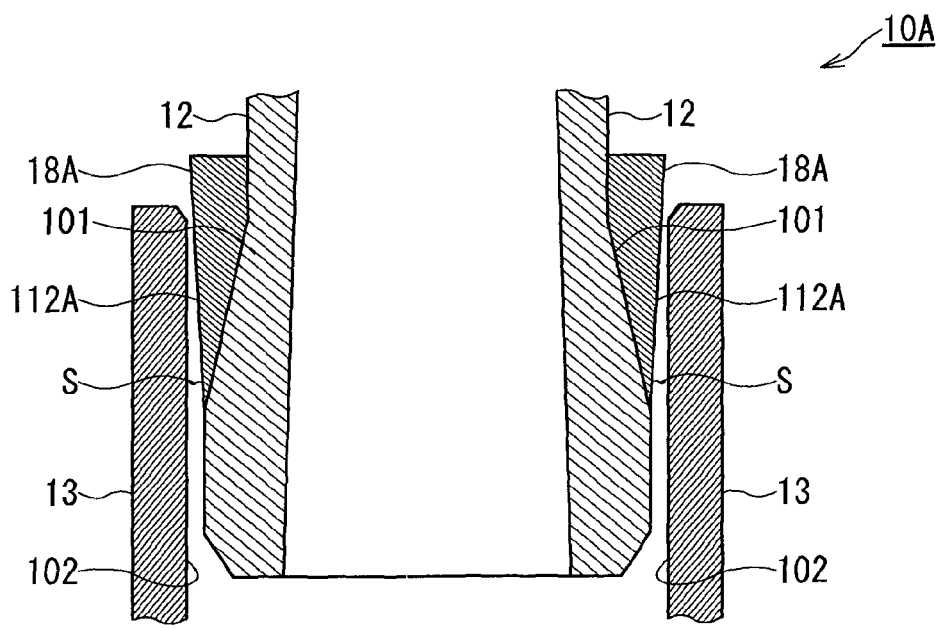
FIG. 17 is a view showing a variation of the jet pump of the second embodiment.

In the second embodiment, as shown in FIG. 17, a slip joint clamp 18A may be provided, which is mounted so as to surround the outer pipe wall 101 of the inlet mixer pipe 12 and inserted into the clearance flow path for pumped coolant water defined by the outer pipe wall 101 of the inlet mixer pipe 12 and the inner pipe wall 102 of the diffuser pipe 13, wherein a narrowing clearance flow path may be defined by an outer wall 112A of the slip joint clamp configured to gradually increase an outer diameter thereof with distance away from a lower end of the slip joint clamp 18A, and the inner pipe wall 102 of the diffuser pipe 13.

Figure 18:
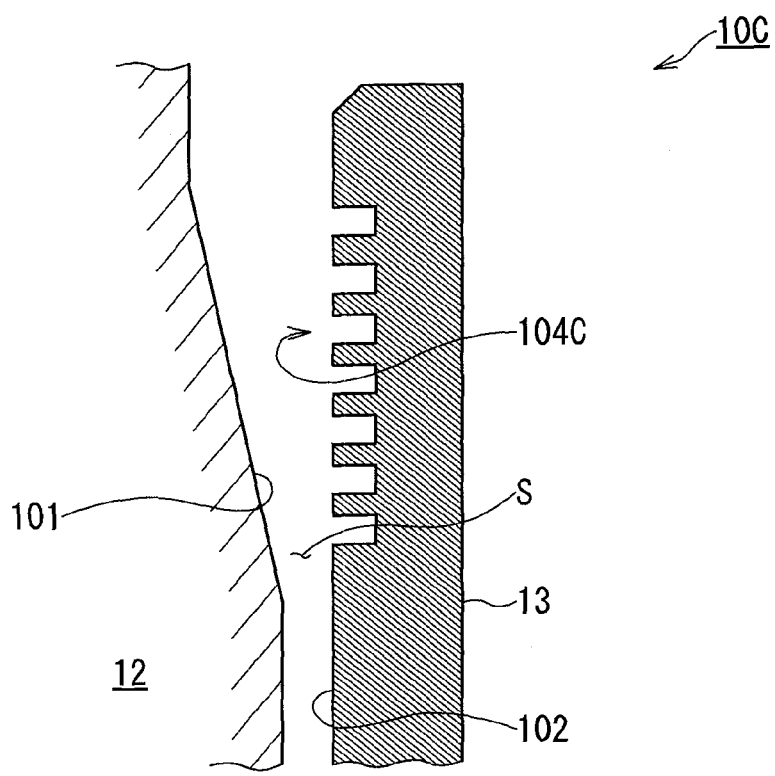
FIG. 18 is a view showing a variation of the jet pump of the fourth embodiment.

In the fourth embodiment, as shown in FIG. 18, the labyrinth structure 104C may be provided on the inner pipe wall 102 of the diffuser pipe 13.

In the fifth embodiment, the ridge structure 105D may be provided on the inner pipe wall 102 of the diffuser pipe 13.

Figure 19:
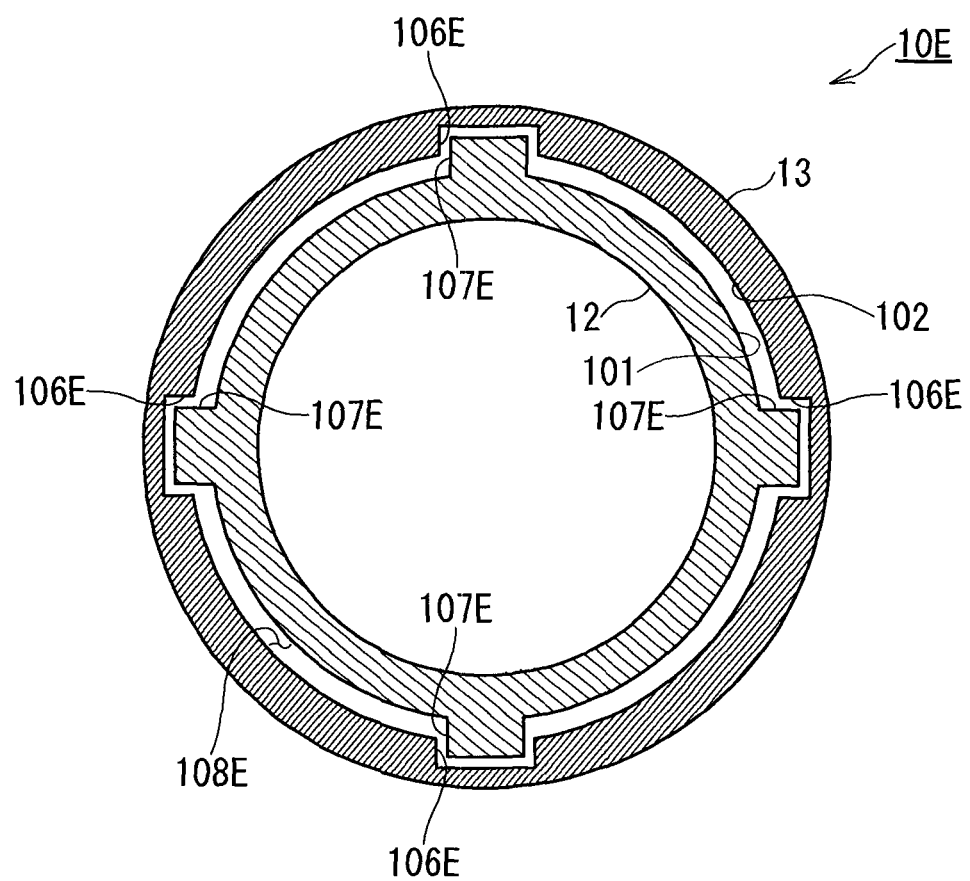
FIG. 19 is a view showing a variation of the jet pump of the sixth embodiment.

In the sixth embodiment, as shown in FIG. 19, the groove portions 106E may be provided on the inner pipe wall 102 of the diffuser pipe 13, and the convex portions 107E may be provided on the outer pipe wall 101 of the inlet mixer pipe 12. Alternatively, a groove portion 106E and a convex portion 107E may be alternately provided on either the inner pipe wall 102 of the diffuser pipe 13 or the outer pipe wall 101 of the inlet mixer pipe 12.

Figure 20:
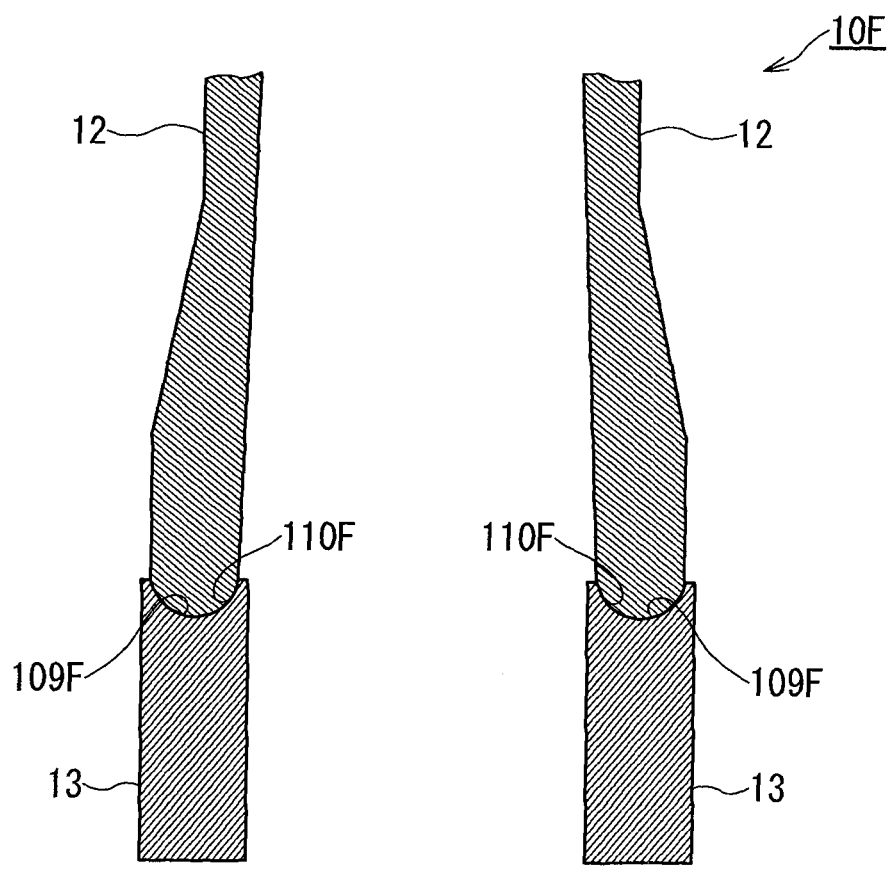
FIG. 20 is a view showing a variation of the jet pump of the seventh embodiment.

In the seventh embodiment, as shown in FIG. 20, the convex sphere 110F may be formed on the opening edge of the inlet mixer pipe 12, and the concave sphere 109F may be formed on the opening edge of the diffuser pipe 13.

The invention claimed is:

1. A jet pump disposed in a reactor pressure vessel of a boiling water reactor, the jet pump including an inlet mixer pipe connected to a riser pipe, and a diffuser pipe connected to the inlet mixer pipe to cause a forced circulation of coolant water in the reactor pressure vessel, the jet pump comprising:
a slip joint structure connecting the inlet mixer pipe and the diffuser pipe to each other by inserting the inlet mixer pipe into an upper end opening of the diffuser pipe with a clearance left therebetween; and
a self vibration damping structure configured such that when the clearance defined by an outer pipe wall of the inlet mixer pipe and an inner pipe wall of the diffuser pipe is widening or narrowing due to vibration of the inlet mixer pipe or the diffuser pipe, a flow path resistance inside a clearance flow path for pumped coolant water defined by the clearance is not smaller than a fluid inertia force all over the clearance flow path.

2. The jet pump according to claim 1, wherein the self vibration clamping structure includes a narrowing clearance flow path configured to gradually narrow the clearance flow path for pumped coolant water defined by the outer pipe wall of the inlet mixer pipe and the inner pipe wall of the diffuser pipe toward an upper end of the diffuser pipe.

3. The jet pump according to claim 2, wherein the narrowing clearance flow path is defined by the outer pipe wall of the inlet mixer pipe configured to gradually increase an outer diameter thereof with distance away from a lower end of the inlet mixer pipe, and the inner pipe wall of the diffuser pipe configured such that an inner diameter thereof is uniform.

4. The jet pump according to claim 2, wherein the narrowing clearance flow path is defined by the inner pipe wall of the diffuser pipe configured to gradually increase an inner diameter thereof with distance away from the upper end of the diffuser pipe, and the outer pipe wall of the inlet mixer pipe configured such that an outer diameter thereof is uniform.

5. The jet pump according to claim 2, wherein the narrowing clearance flow path is defined by the outer pipe wall of the inlet mixer pipe configured to gradually increase an outer diameter thereof with distance away from a lower end of the inlet mixer pipe, and the inner pipe wall of the diffuser pipe configured to gradually increase an inner diameter thereof with distance away from the upper end of the diffuser pipe.

6. The jet pump according to claim 2, further comprising a slip joint clamp provided so as to cover an opening edge of the diffuser pipe, and inserted into the clearance flow path for pumped coolant water defined by the outer pipe wall of the inlet mixer pipe and the inner pipe wall of the diffuser pipe;
wherein the narrowing clearance flow path is defined by an inner wall of the slip joint clamp configured to gradually decrease an inner diameter thereof with distance away from a lower end of the slip joint clamp, and the outer pipe wall of the inlet mixer pipe.

7. The jet pump according to claim 2, further comprising a slip joint clamp provided so as to cover an opening edge of the inlet mixer pipe, and inserted into the clearance flow path for pumped coolant water defined by the outer pipe wall of the inlet mixer pipe and the inner pipe wall of the diffuser pipe;
wherein the narrowing clearance flow path is defined by an outer wall of the slip joint clamp configured to gradually increase an outer diameter thereof with distance away from a lower end of the slip joint clamp, and the inner pipe wall of the diffuser pipe.

8. The jet pump according to claim 1, wherein the self vibration clamping structure has a configuration in which the clearance flow path for pumped coolant water defined by the outer pipe wall of the inlet mixer pipe and the inner pipe wall of the diffuser pipe has a minimum clearance flow path width on a downstream side in a coolant water pumping direction, and a maximum clearance flow path width on an upstream side in the coolant water pumping direction, as well as is configured such that a value of "(the maximum clearance flow path width−the minimum clearance flow path width)÷(the minimum clearance flow path width)" is less than 1.

9. The jet pump according to claim 1, wherein the self vibration damping structure comprises a labyrinth structure provided on any one side of the outer pipe wall of the inlet mixer pipe and the inner pipe wall of the diffuser pipe, the labyrinth structure forming a turbulent flow in a clearance flow flowing through the clearance flow path for pumped coolant water defined by the outer pipe wall of the inlet mixer pipe and the inner pipe wall of the diffuser pipe.

10. The jet pump according to claim 9, wherein the labyrinth structure is provided on any one of the outer pipe wall of the inlet mixer pipe and the inner pipe wall of the diffuser pipe.

11. The jet pump according to claim 1, wherein the self vibration damping structure is provided on any one of the outer pipe wall of the inlet mixer pipe and the inner pipe wall of the diffuser pipe, and comprises a ridge structure that projects so as to block a clearance flow flowing through the clearance flow path for pumped coolant water defined by the outer pipe wall of the inlet mixer pipe and the inner pipe wall of the diffuser pipe.

12. The jet pump according to claim 11, wherein the ridge structure is provided on any one of the outer pipe wall of the inlet mixer pipe and the inner pipe wall of the diffuser pipe.

13. A jet pump disposed in a reactor pressure vessel of a boiling water reactor, the jet pump including an inlet mixer pipe connected to a riser pipe, and a diffuser pipe connected to the inlet mixer pipe to cause a forced circulation of coolant water in the reactor pressure vessel, the jet pump comprising:
a slip joint structure connecting the inlet mixer pipe and the diffuser pipe to each other by inserting the inlet mixer pipe into an upper end opening of the diffuser pipe with a clearance left therebetween; and
a self vibration damping structure including a groove portion provided on any one side of an outer pipe wall of the inlet mixer pipe and an inner pipe wall of the diffuser pipe, and a convex portion provided on the other side and being fit into the groove portion with a minute clearance left therebetween.

14. A jet pump disposed in a reactor pressure vessel of a boiling water reactor, the jet pump including an inlet mixer pipe connected to a riser pipe, and a diffuser pipe connected to the inlet mixer pipe to cause a forced circulation of coolant water in the reactor pressure vessel, the jet pump comprising:
a non-slip joint structure connecting the inlet mixer pipe and the diffuser pipe to each other by abutting an opening edge of the inlet mixer pipe against an opening edge of the diffuser pipe.

15. The jet pump according to claim 14, wherein any one side of the opening edge of the inlet mixer pipe and the opening edge of the diffuser pipe is formed into a convex sphere, and the other side is formed into a concave sphere that receives the convex sphere.

16. A method for restraining vibration of a jet pump disposed in a reactor pressure vessel of a boiling water reactor, in which an inlet mixer pipe and a diffuser pipe are connected to each other by inserting the inlet mixer pipe into an upper end opening of the diffuser pipe with a clearance left therebetween, to cause a forced circulation of coolant water in the reactor pressure vessel, the method including:
controlling a flow of a clearance flow such that when the clearance defined by an outer pipe wall of the inlet mixer pipe and an inner pipe wall of the diffuser pipe is widening or narrowing due to vibration of the inlet mixer pipe or the diffuser pipe, a flow path resistance inside a clearance flow path for pumped coolant water defined by the clearance is not smaller than a fluid inertia force all over the clearance flow path.

\* \* \* \* \*